United States Patent
Kim et al.

(10) Patent No.: US 11,210,582 B2
(45) Date of Patent: Dec. 28, 2021

(54) NEUROMORPHIC DEVICE HAVING A PLURALITY OF SYNAPSE BLOCKS SHARING A COMMON LOGIC ELEMENT

(71) Applicant: SK hynix Inc., Icheon (KR)

(72) Inventors: Seong-Hyun Kim, Suwon-si (KR); Sang-Heon Lee, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 504 days.

(21) Appl. No.: 16/186,933

(22) Filed: Nov. 12, 2018

(65) Prior Publication Data

US 2019/0294958 A1    Sep. 26, 2019

(30) Foreign Application Priority Data

Mar. 21, 2018   (KR) .................. 10-2018-0032549

(51) Int. Cl.
*G06N 3/063*    (2006.01)

(52) U.S. Cl.
CPC .................. *G06N 3/0635* (2013.01)

(58) Field of Classification Search
CPC ..................................... G06N 3/0635
See application file for complete search history.

(56) References Cited

U.S. PATENT DOCUMENTS

| | | |
|---|---|---|
| 9,159,020 B2 | 10/2015 | Alcarez-Icaza Rivera et al. |
| 2015/0347870 A1* | 12/2015 | Andreopoulos ..... G06K 9/4661 382/190 |
| 2016/0267379 A1* | 9/2016 | Eleftheriou .......... G06N 3/0635 |
| 2016/0350647 A1* | 12/2016 | Hosokawa ............ G06N 3/088 |
| 2018/0189646 A1* | 7/2018 | Kumar .................. G06N 3/063 |

* cited by examiner

*Primary Examiner* — Douglas King

(57) ABSTRACT

A neuromorphic device is disclosed. The neuromorphic device may include an input element; a synapse element having a plurality of synapse blocks; a logic element; and an output element. The plurality of synapse blocks may share the logic element.

18 Claims, 15 Drawing Sheets

NEUROMORPHIC DEVICE HAVING A PLURALITY OF SYNAPSE BLOCKS SHARING A COMMON LOGIC ELEMENT

CROSS-REFERENCE TO RELATED APPLICATIONS

The present application claims priority under 35 U.S.C. 119(a) to Korean Patent Application No. 10-2018-0032549, filed on Mar. 21, 2018, which is incorporated herein by reference in its entirety.

BACKGROUND

1. Field

Exemplary embodiments of the present invention relate to a neuromorphic device having a plurality of synapse blocks that share a common logic element.

2. Description of the Related Art

Recently, neuromorphic technology, which imitates the human brain, is drawing attention. Neuromorphic technology may include multiple pre-synaptic neurons, multiple post-synaptic neurons, and multiple synapses. A neuromorphic device used in neuromorphic technology may output pulses or spikes at various levels, sizes, or time, depending on the learned state.

SUMMARY

Embodiments of the present disclosure provide to a neuromorphic device having a plurality of synapse blocks sharing a common logic element.

Embodiments of the present disclosure provide an electronic system including a neuromorphic device having a plurality of synapse blocks that share a common logic element.

In accordance with an embodiment of the present disclosure, a neuromorphic device may include an input element; a synapse element having a plurality of synapse blocks; a logic element; and an output element. The plurality of synapse blocks may share the logic element.

In accordance with another embodiment of the present disclosure, a neuromorphic device includes: a synapse element having a plurality of synapse blocks; and a logic element coupled in common to the plurality of synapse blocks, wherein the logic element receives synapse signals from the plurality of synapse blocks and provides re-input signals to the plurality of synapse blocks.

The details of other embodiments are included in the detailed description and the drawings.

DETAILED DESCRIPTION

Figure 1:
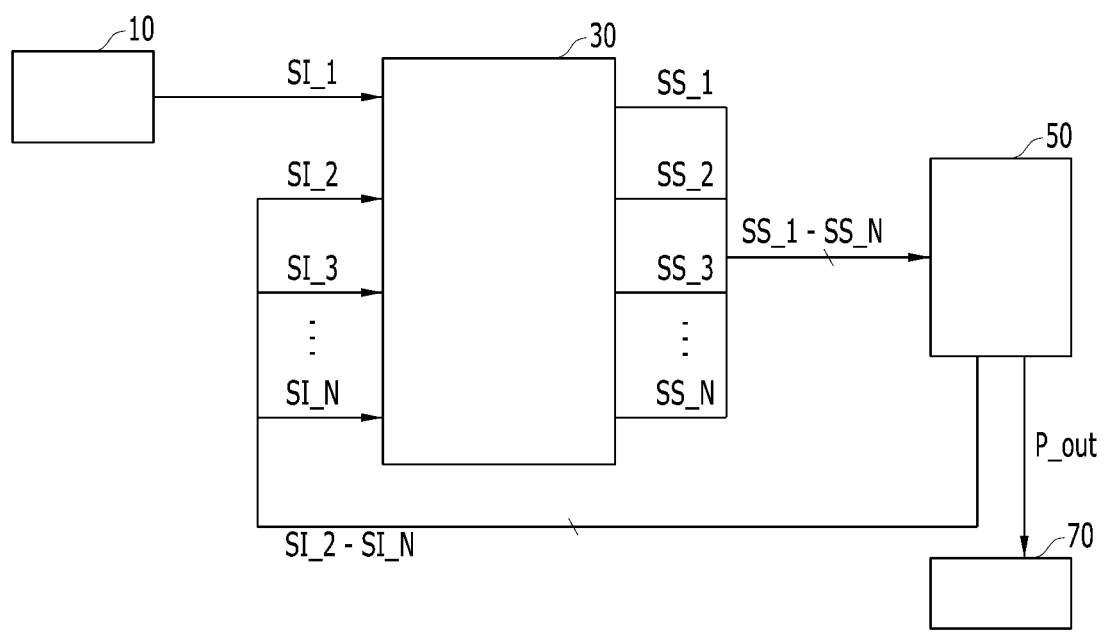
FIG. 1 is a block diagram schematically illustrating a neuromorphic device in accordance with an embodiment of the present disclosure.

Various embodiments will be described below in more detail with reference to the accompanying drawings. Embodiments of the present disclosure may, however, have different forms and should not be construed as limited to the embodiments set forth herein. Rather, these embodiments are provided so that this disclosure will be thorough and complete, and will fully convey the scope of the claims to those skilled in the art.

Throughout the specification, like reference numerals refer to the same elements. Therefore, although the same or similar reference numerals are not mentioned or described in the corresponding drawing, the reference numerals may be described with reference to other drawings. Furthermore, although elements are not represented by reference numerals, the elements may be described with reference to other drawings.

FIG. 1 is a block diagram schematically illustrating a neuromorphic device in accordance with an embodiment of the present disclosure. Referring to FIG. 1, a neuromorphic device in accordance with the embodiment of the present disclosure may include an input element 10, a synapse element 30, a logic element 50, and an output element 70.

The input element 10 may provide a first input signal SI_1 to the synapse element 30. The first input signal SI_1 may include a data pattern to be written into the synapse element 30 or command signals to operate the synapse element 30. For example, the input element 10 may include at least one of a camera, a scanner, a bar-code reader, a quick response (QR) code reader, an optical mark reader (OMR), an optical character reader (OCR), a microphone, a keyboard, a mouse, a trackball, a touch screen, a touch pen, a light pen, a joystick, or other data recognition devices. According to another embodiment of the present disclosure, the input element 10 may include a pre-synaptic neuron circuit.

The synapse element 30 may receive input signals SI_1 to SI_N from the input element 10 and/or the logic element 50, and perform a synapse operation. For example, the synapse element 30 may transform the received input signals SI_1 to SI_N into synaptic weights and store them in synapses, and/or output synapse signals SS_1 to SS_N corresponding to the synaptic weights stored in the synapses.

The logic element 50 may receive the synapse signals SS_1 to SS_N from the synapse element 30 to perform various circuitry processing, and provide the input signals SI_2 to SI_N to the synapse element 30, or provide an output signal P_out obtained by processing the synapse signals SS_1 to SS_N to the output element 70. For example, the logic element 50 may perform a quantization operation, a de-quantization operation, a converting operation, a counting operation, a storage operation, a latching operation, a comparing operation, a multiplexing operation, a de-multiplexing operation, and/or diverse other electrical circuit operations.

The output element 70 may receive the output signal P_out provided from the logic element 50 and may output it visually, audibly, or electrically. For example, the output element 70 may include a display monitor, a video projector, a printer, a speaker phone, a plotter, a perforator, a communication port for outputting electrical digital data, or other visual or auditory display devices.

Figure 2:
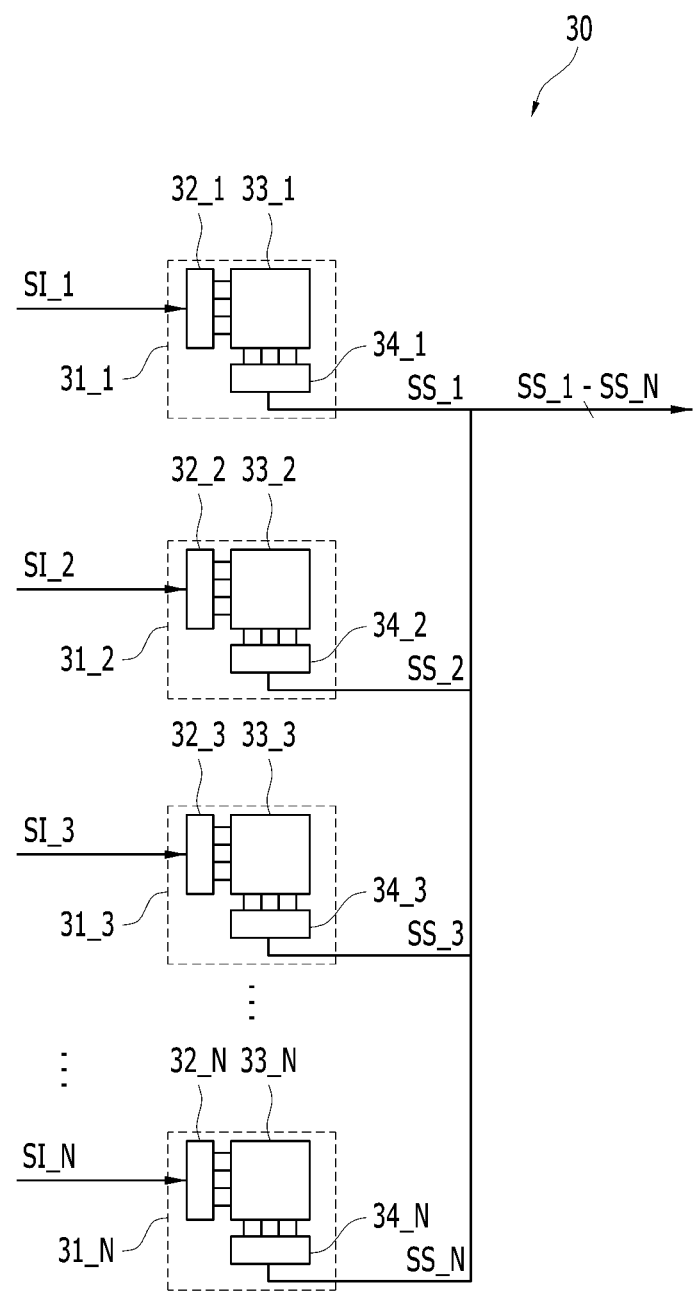
FIG. 2 is a block diagram schematically illustrating a synapse element of the neuromorphic device shown in FIG. 1.

FIG. 2 is a block diagram schematically illustrating the synapse element 30 of the neuromorphic device shown in FIG. 1. Referring to FIG. 2, the synapse element 30 may include a plurality of synapse blocks 31_1 to 31_N. For example, the synapse element 30 may include first to $N^{th}$ synapse blocks 31_1 to 31_N with each synapse block capable of operating independently from one another. The first to $N^{th}$ synapse blocks 31_1 to 31_N may include first to $N^{th}$ pre-synaptic neurons 32_1 to 32_N, first to $N^{th}$ synapse arrays 33_1 to 33_N, and first to $N^{th}$ post-synaptic neurons 34_1 to 34_N, respectively.

The first to $N^{th}$ synapse blocks 31_1 to 31_N may receive the first to $N^{th}$ input signals SI_1 to SI_N, respectively. The first to $N^{th}$ input signals SI_1 to SI_N may be data patterns to be written in the first to $N^{th}$ synapse arrays 33_1 to 33_N, or pulse signals for outputting the synaptic weights stored in the first to $N^{th}$ synapse arrays 33_1 to 33_N. For example, the first input signal SI_1 may be provided from the input element 10 of FIG. 1, and the second to $N^{th}$ input signals SI_2 to SI_N may be provided from the logic element 50 as shown in FIG. 1.

The first to $N^{th}$ pre-synaptic neurons 32_1 to 32_N may provide the pulse signals to the first to $N^{th}$ synapse arrays 33_1 to 33_N according to the first to $N^{th}$ input signals SI_1 to SI_N, respectively. The pulses may include data signals and/or command signals.

Each of the first to $N^{th}$ synapse arrays 33_1 to 33_N may include a plurality of row lines extending in a row direction, a plurality of column lines extending in a column direction, and synapse cells that are disposed in a form of matrix at intersection regions between the row lines and the column lines. The synapse cells may include a resistive variable element. The first to $N^{th}$ synapse arrays 33_1 to 33_N may respectively receive the pulse signals from the first to $N^{th}$ pre-synaptic neurons 32_1 to 32_N to update the synaptic weights in the synapse cells or to provide the synaptic weights in the synapse cells to the first to $N^{th}$ post-synaptic neurons 34_1 to 34_N.

The first to $N^{th}$ post-synaptic neurons 34_1 to 34_N may provide synapse signals SS_1 to SS_N, as processed electrical signals provided from the first to $N^{th}$ synapse arrays 33_1 to 33_N to the logic element 50, respectively.

The first to $N^{th}$ synapse blocks 31_1 to 31_N may be simultaneously activated. For example, when the amount of data to be processed is large, a plurality of synapse blocks may be simultaneously activated to process data in parallel. Alternatively, when the data to be processed are provided consecutively, while a first data is processed in one synapse block, a second data may be processed in another synapse block. In this case, the logic element 50 may selectively input/output the first to $N^{th}$ input signals SI_1 to SI_N and the first to $N^{th}$ synapse signals SS_1 to SS_N.

Figure 3:
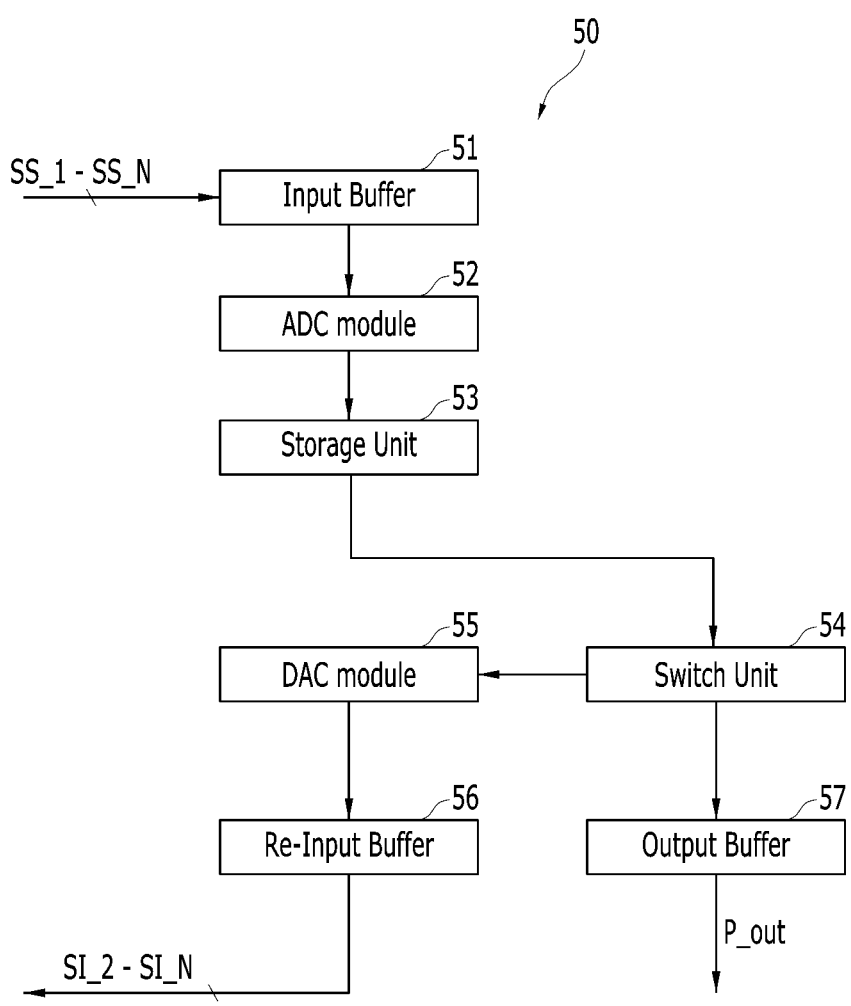
FIG. 3 is a block diagram schematically illustrating a logic element of the neuromorphic device shown in FIG. 1.

FIG. 3 is a block diagram schematically illustrating the logic element 50 of the neuromorphic device shown in FIG. 1. Referring to FIG. 3, the logic element 50 may include an input buffer 51, an analog-to-digital converting (ADC) module 52, a storage unit 53, a switch unit 54, a digital-to-analog converting (DAC) module 55, a re-input buffer 56, and an output buffer 57.

The input buffer 51 may temporarily store or latch the synapse signals SS_1 to SS_N transferred from the first to $N^{th}$ synapse blocks 31_1 to 31_N. According to another embodiment of the present disclosure, the input buffer 51 may include a multiplexer. The input buffer 51 may provide the synapse signals SS_1 to SS_N transferred from the first through $N^{th}$ synapse blocks 31_1 to 31_N to the ADC module 52.

The ADC module 52 may quantize the synapse signals SS_1 to SS_N or the electrical signals processed by the input buffer 51. For example, the ADC module 52 may include an analog-to-digital converter.

The storage unit 53 may temporarily store or latch electrical data signals quantized by the ADC module 52. For example, the storage unit 53 may be a Static Random Access Memory (SRAM), a Dynamic Random Access Memory (DRAM), a Resistive Random Access Memory (ReRAM), a Magneto-resistive Random Access Memory (MRAM), a Phase Changeable Random Access Memory (PCRAM), or various other memory elements.

The switch unit 54 may provide the storage data that are temporarily stored in the storage unit 53 to the synapse element 30 or the output element 70. For example, when the storage data temporarily stored in the storage unit 53 are to be re-inputted to one among the second to $N^{th}$ synapse blocks 31_2 to 32_N, the switch unit 54 may provide the storage data to the DAC module 55. Alternatively, when the storage data temporarily stored in the storage unit 53 are to be provided to the output element 50, the switch unit 54 may provide the storage data to the output buffer 57. The operation of the switch unit 54 may be performed according to a command signal of a switching controller. The switching controller may provide the command signal to the switch unit 54 based on whether the storage data temporarily stored in the storage unit 53 need to be further processed. For example, when the storage data need to be compressed, expanded, or additionally processed, the storage data may be provided to the DAC module 55. The switching controller may be controlled by a microprocessor or a central processing unit.

The DAC module 55 may anti-quantize the storage data and provide the anti-quantized data to the re-input buffer 56. For example, the DAC module 55 may include a digital-to-analog converter. The address of one block among the second to $N^{th}$ synapse blocks 31_2 to 31_N to which the storage data are to be provided may be provided to the switch unit 54, the DAC module 55, or the re-input buffer 56.

The re-input buffer 56 may temporarily store or latch the data signal provided from the DAC module 55. The re-input buffer 56 may provide the electrical signals provided from the DAC module 55 to the synapse element 30. For example, the re-input buffer 56 may supply the anti-quantized storage signal as input signals SI_2 to SI_N to one among the second to $N^{th}$ synapse blocks 31_2 to 31_N of the synapse element 30, respectively. Accordingly, the re-input buffer 56 may include a block selector or a block selecting circuit for selecting one among the second to $N^{th}$ synapse blocks 31_2 to 31_N. According to another embodiment of the present disclosure, the re-input buffer 56 may include a de-multiplexer.

The output buffer 57 may compare, latch or amplify the storage data provided from the storage unit 53 based on the determination of the switch unit 54 and provide the resultant data to the output element 70. For example, the output buffer 57 may include a comparator such as a Winner Takes All (WTA) module. In other words, the output buffer 57 may provide the final data pattern recognized based on the storage data to the output element 70.

Figure 4:
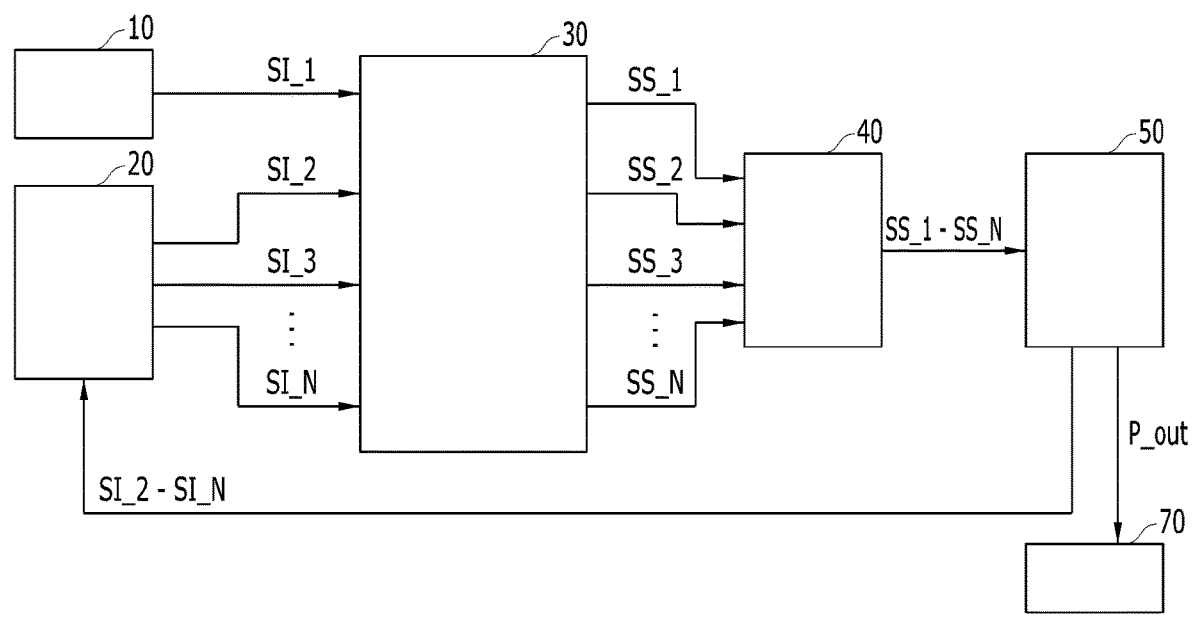
FIG. 4 is a block diagram schematically illustrating a neuromorphic device in accordance with an embodiment of the present disclosure.

FIG. 4 is a block diagram schematically illustrating a neuromorphic device in accordance with an embodiment of the present disclosure. Referring to FIG. 4, the neuromorphic device in accordance with the embodiment of the present disclosure may include an input element 10, a block selector 20, a synapse element 30, a data collector 40, a logic element 50, and an output element 70. The input element 10 may provide the first input signal SI_1 directly to the synapse element 30. The output element 70 is described above and may be understood with reference to FIG. 1.

The block selector 20 may select one among the second to $N^{th}$ synapse blocks 31_2 to 31_N in the synapse element 30 to provide the input signals SI_2 to SI_N received from the logic element 50. The block selector 20 may include a de-multiplexer and/or the re-input buffer 56 described above and illustrated in FIG. 3.

The data collector 40 may provide the synapse signals SS_1 to SS_N received from the first to $N^{th}$ synapse blocks 31_1 to 31_N of the synapse element 30 to the logic element 50. The data collector 40 may include a multiplexer and/or an input buffer 51 described above and illustrated in FIG. 3.

Figure 5:
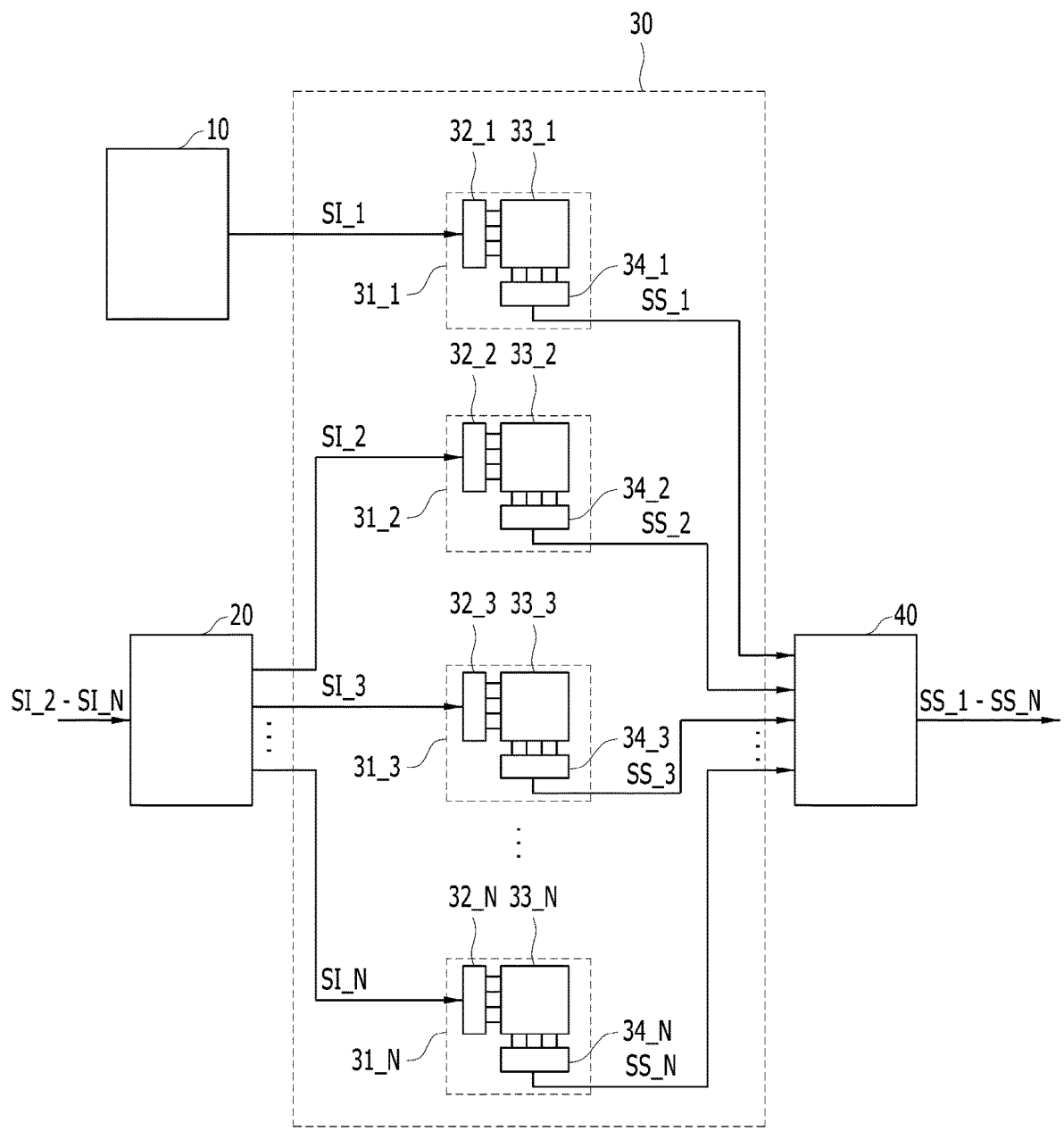
FIG. 5 is a block diagram illustrating a block selector, a synapse element, and a data collector of FIG. 4.

FIG. 5 is a block diagram illustrating the block selector 20, the synapse element 30, and the data collector 40 of FIG. 4. Referring to FIG. 5, the synapse element 30 may include the first through $N^{th}$ synapse blocks 31_1 to 31_N.

The block selector 20 may independently and exclusively distribute the input signals SI_2 to SI_N received from the logic element 50 to the first to $N^{th}$ pre-synaptic neurons 32_2 to 32_N of the second to $N^{th}$ synapse blocks 31_2 to 31_N. Synapse signals SS_1 to SS_N may be provided from the first to $N^{th}$ post-synaptic neurons 34_1 to 34_N of the first to $N^{th}$ synapse blocks 31_1 to 31_N may be independently supplied to the data collector 40. The data collector 40 may provide the received synapse signals SS_1 to SS_N to the logic element 50.

Similar to the illustration in FIG. 2, the synapse element 30 of FIG. 5 may include first to $N^{th}$ synapse blocks 31_1 to 31_N, which may be activated at the same time. In this case, the block selector 20 may provide the second to $N^{th}$ input signals SI_2 to SI_N to the second to $N^{th}$ synapse blocks 31_2 to 31_N in the synapse element 30 respectively and independently. The signals may be provided at temporal intervals. Also, the data collector 40 may selectively receive the first to $N^{th}$ synapse signals SS_1 to SS_N and provide them to the logic element 50.

Figure 6:
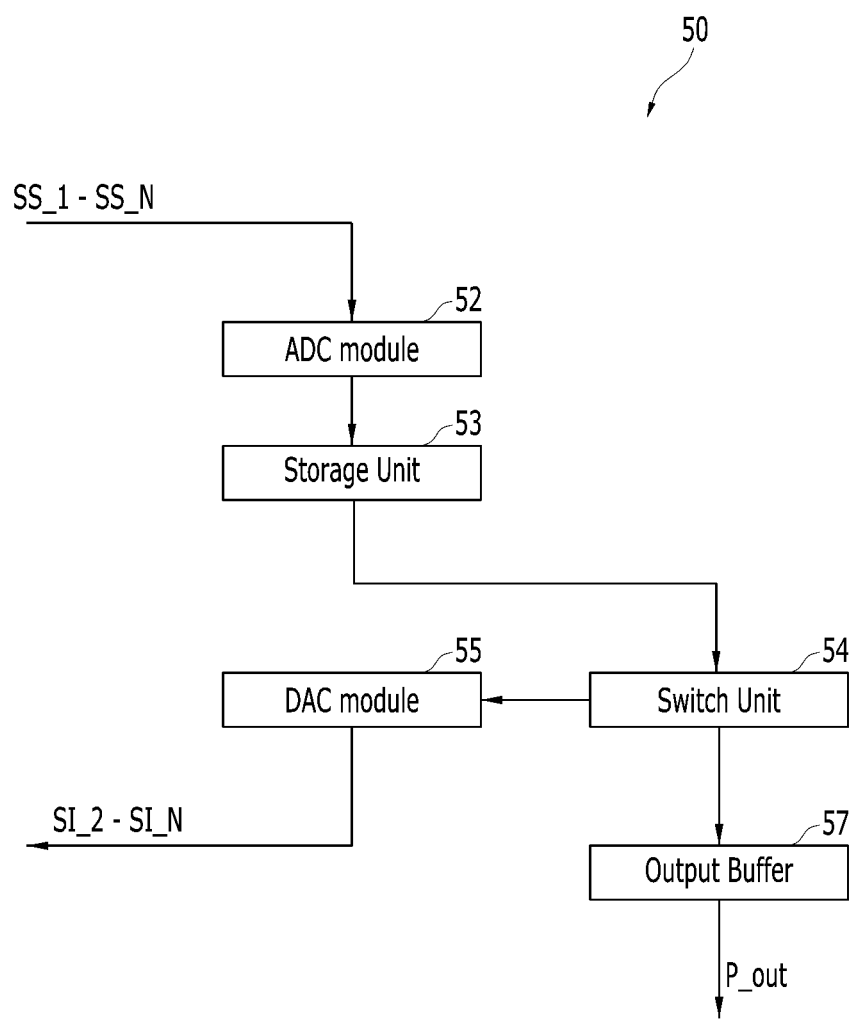
FIG. 6 is a block diagram illustrating a logic element of FIG. 4.

FIG. 6 is a block diagram illustrating the logic element 50 of FIG. 4. Referring to FIG. 6, the logic element 50 may include an analog-to-digital converting (ADC) module 52, a storage unit 53, a switch unit 54, a digital-to-analog converting (DAC) module 55, and an output buffer 57. Compared with the logic element 50 of FIG. 3, the logic element 50 of FIG. 6 does not include the input buffer 51 and the re-input buffer 56. The function or circuit of the input buffer 51 of FIG. 3 may be included in the data collector 40 of FIGS. 4 and 5. For example, the data collector 40 may temporarily store or latch the synapse signals SS_1 to SS_N received from the first to $N^{th}$ synapse blocks 31_1 to 31_N, and output the synapse signals SS_1 to SS_N to the ADC module 52. The ADC module 52, the storage unit 53, and the switch unit 54 may be understood with reference to FIG. 3. The function or circuit of the re-input buffer 56 of FIG. 3 may be included in the block selector 20 of FIGS. 4 and 5. In FIG. 4, for example, data signals SI_2 to SI_N received from the DAC module 55 may be temporarily stored or latched in the block selector 20.

Figure 7:
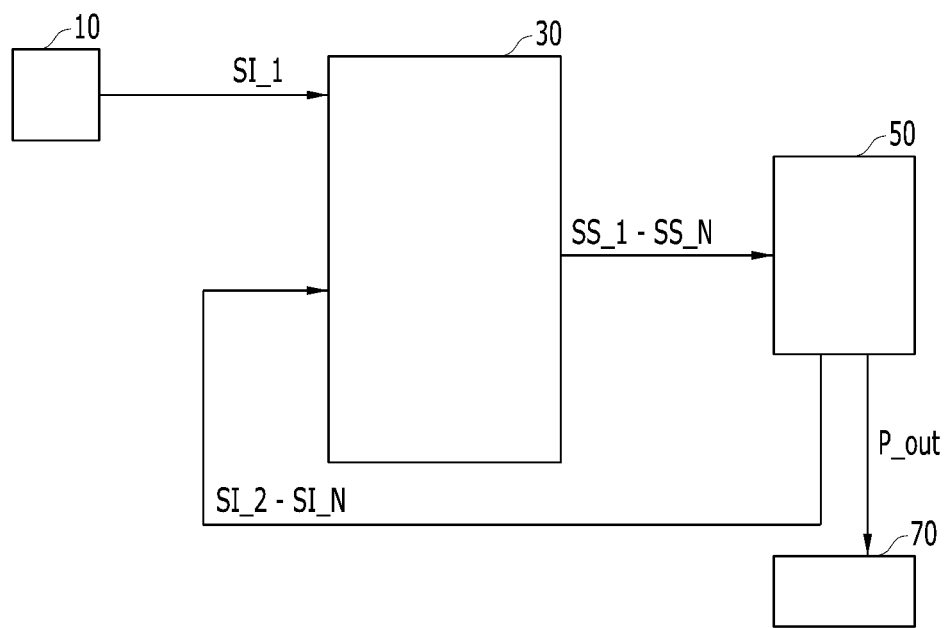
FIG. 7 is a block diagram illustrating a neuromorphic device in accordance with an embodiment of the present disclosure.

FIG. 7 is a block diagram illustrating a neuromorphic device in accordance with an embodiment of the present disclosure. Referring to FIG. 7, the neuromorphic device in accordance with the embodiment of the present disclosure may include an input element 10, a synapse element 30, a logic element 50, and an output element 70. The input element 10 and the output element 70 may be understood as described above with reference to FIG. 1. The synapse element 30 will be described in detail with reference to FIG. 8.

Figure 8:
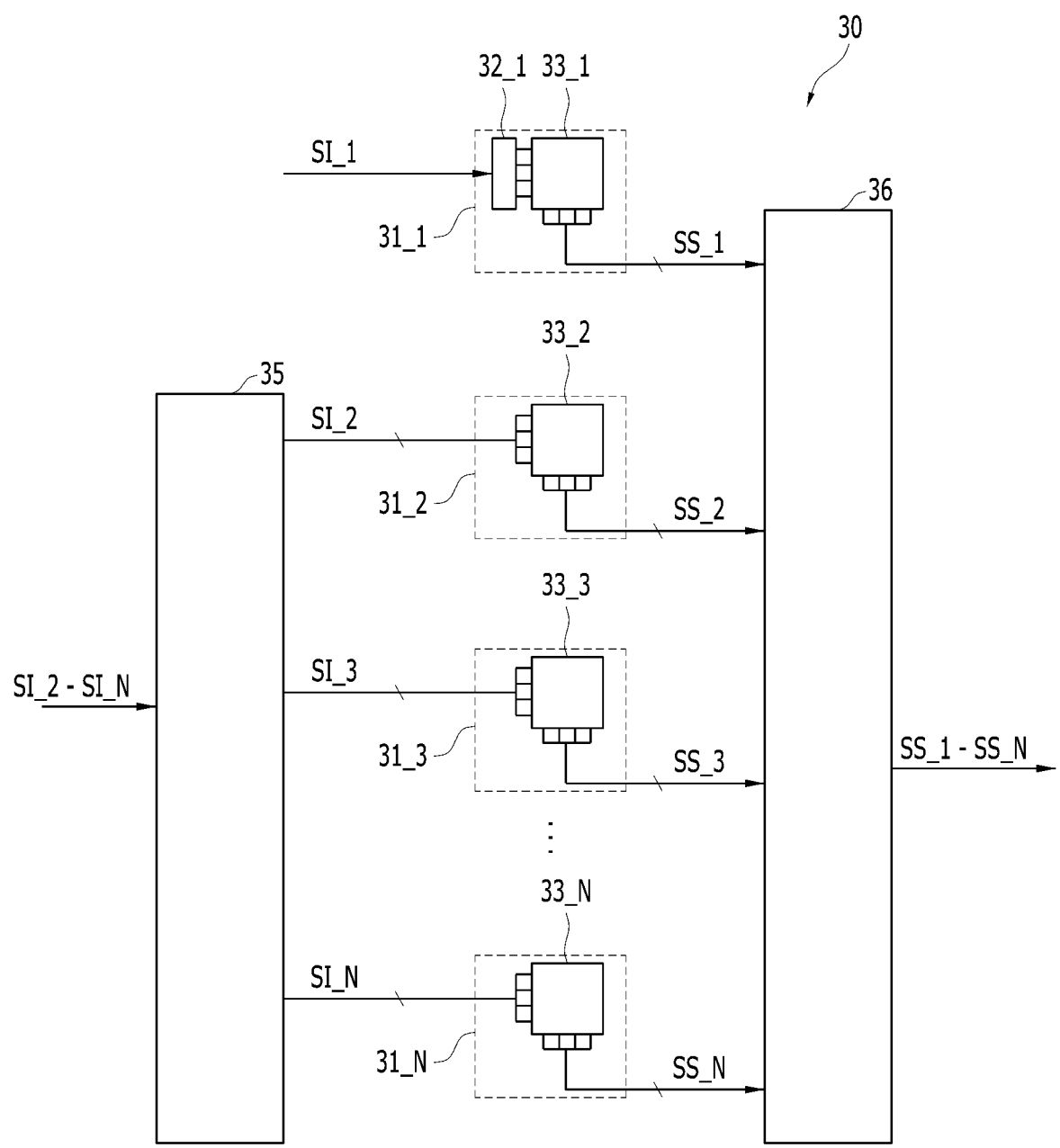
FIG. 8 is a block diagram illustrating a synapse element of the neuromorphic device shown in FIG. 7.

FIG. 8 is a block diagram illustrating the synapse element 30 of the neuromorphic device shown in FIG. 7. Referring to FIG. 8, the synapse element 30 may include a common pre-synaptic buffer 35, first to $N^{th}$ synapse blocks 31_1 to 31_N, and a common post-synaptic buffer 36. The first to $N^{th}$ synapse blocks 31_1 to 31_N may include first to $N^{th}$ synapse arrays 33_1 to 33_N, respectively.

The common pre-synaptic buffer 35 may include the block selector 20 described with reference to FIGS. 4 and 5 and the second to $N^{th}$ pre-synaptic neurons 32_2 to 32_N described with reference to FIGS. 2 and 5. The common post-synaptic buffer 36 may include the data collector 40 described with reference to FIGS. 4 and 5 and the first to $N^{th}$ post-synaptic neurons 34_1 to 34_N described with reference to FIGS. 2 and 5. In other words, the second to $N^{th}$ synapse blocks 31_2 to 31_N do not include the second to $N^{th}$ pre-synaptic neurons 32_2 to 32_N and the first to $N^{th}$ post-synaptic neurons 34_1 to 34_N. The first synapse block 31_1, however, may include a first pre-synaptic neuron 32_1.

The input signals SI_2 to SI_N provided from the logic element 50 may be provided to the common pre-synaptic buffer 35, and the synapse signals SS_1 to SS_N provided from the first to $N^{th}$ synapse blocks 31_1 to 31_N may be provided, through the common post-synaptic buffer 36, to the logic element 50.

Figure 9:
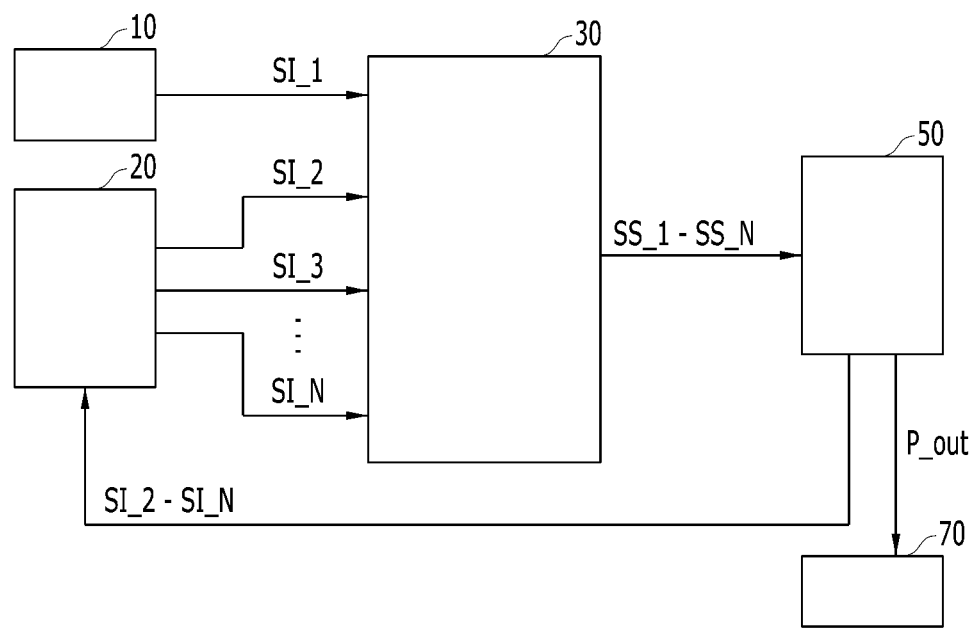
FIG. 9 is a block diagram illustrating a neuromorphic device in accordance with an embodiment of the present disclosure.

FIG. 9 is a block diagram illustrating a neuromorphic device in accordance with an embodiment of the present disclosure. Referring to FIG. 9, the neuromorphic device in accordance with the embodiment of the present disclosure may include an input element 10, a block selector 20, a synapse element 30, a logic element 50, and an output element 70. The input element 10 and the output element 70 may be understood as described with reference to FIG. 1, and the block selector 20 may be understood as described with reference to FIGS. 4 and 5. The synapse element 30 of the neuromorphic device in accordance with the embodiment of the present disclosure will be described in detail with reference to FIG. 10.

Figure 10:
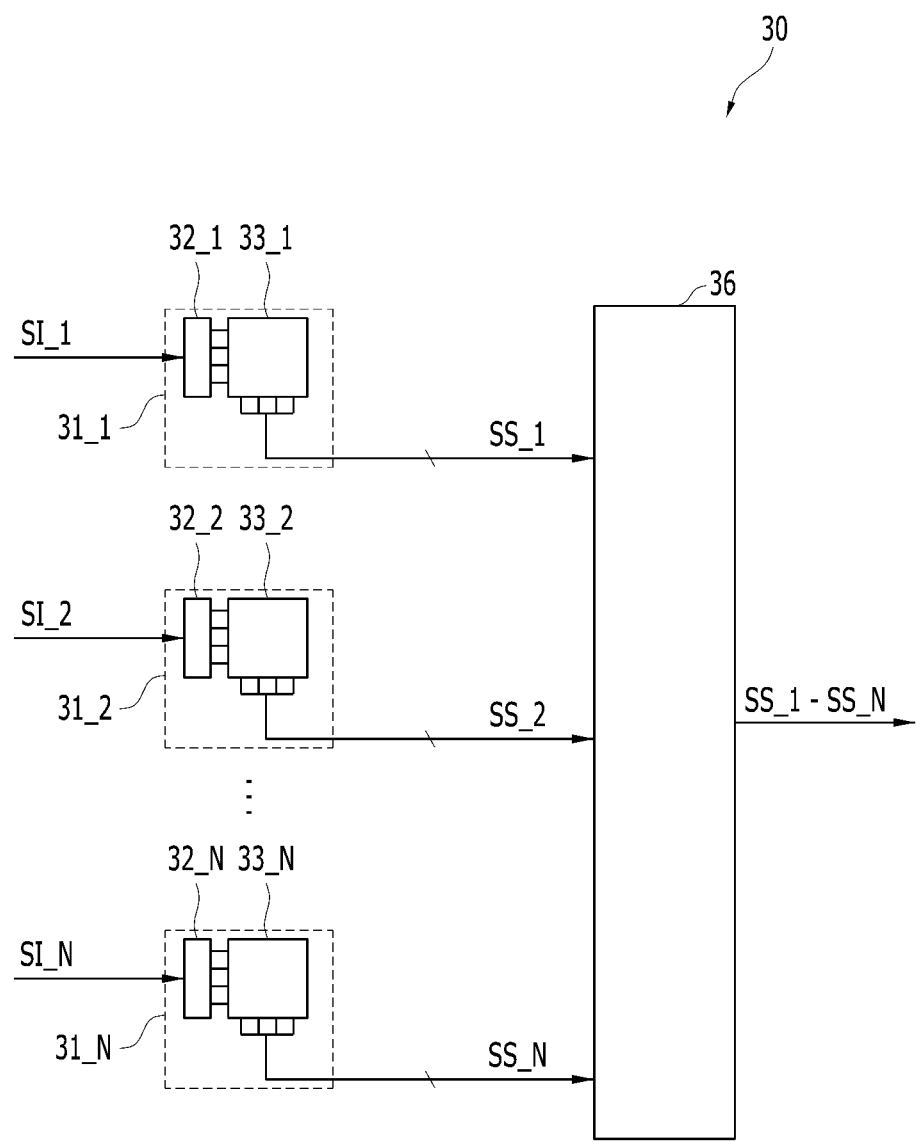
FIG. 10 is a block diagram illustrating a synapse element of the neuromorphic device shown in FIG. 9.

FIG. 10 is a block diagram illustrating the synapse element 30 of the neuromorphic device shown in FIG. 9. Referring to FIG. 10, the synapse element 30 may include first to $N^{th}$ synapse blocks 31_1 to 31_N and a common post-synaptic buffer 36. The common post-synaptic buffer 36 may include the data selector 40 described with reference to FIGS. 4 and 5 and the first to $N^{th}$ post-synaptic neurons 34_1 to 34_N described with reference to FIGS. 2 and 5. The first to $N^{th}$ synapse blocks 31_1 to 31_N do not include the first to $N^{th}$ post-synaptic neurons 34_1 to 34_N, but may include the first to $N^{th}$ pre-synaptic neurons 32_1 to 32_N and the first to $N^{th}$ synapse arrays 33_1 to 33_N, respectively. The synapse signals SS_1 to SS_N provided from the first to $N^{th}$ synapse arrays 33_1 to 33_N may be provided to the logic element 50.

Figure 11:
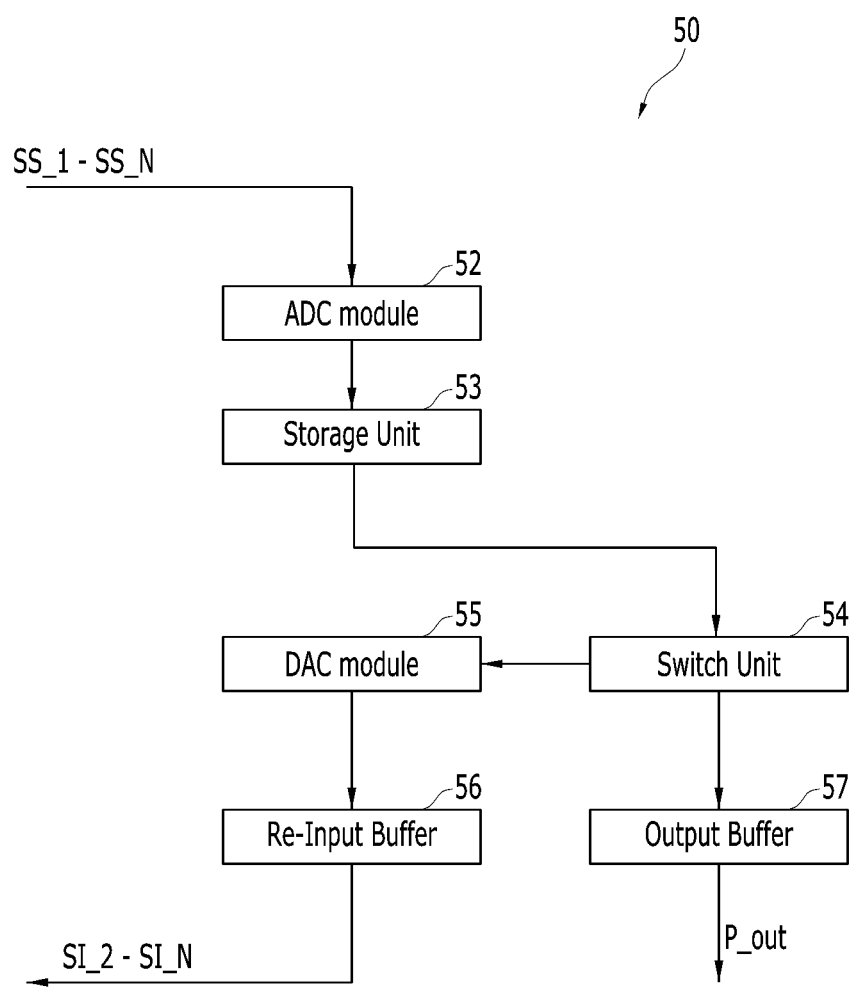
FIG. 11 is a block diagram illustrating a logic element of the neuromorphic device shown in FIG. 9.

FIG. 11 is a block diagram illustrating the logic element 50 of the neuromorphic device shown in FIG. 9. Referring to FIG. 11, the logic element 50 may include an analog-to-digital converting (ADC) module 52, a storage unit 53, a switch unit 54, a digital-to-analog converting (DAC) module 55, a re-input buffer 56, and an output buffer 57. The logic element 50 does not include the input buffer 51 as compared to the logic element 50 of FIG. 3. The function or circuit of the input buffer 51 of FIG. 3 may be included in the common post-synaptic buffer 36 of FIG. 10. For example, the common post-synaptic buffer 36 may temporarily store or latch the synapse signals SS_1 to SS_N received from the first to $N^{th}$ synapse blocks 31_1 to 31_N. The remaining constituent elements of FIG. 11 may be understood as described with reference to FIG. 3.

Figure 12:
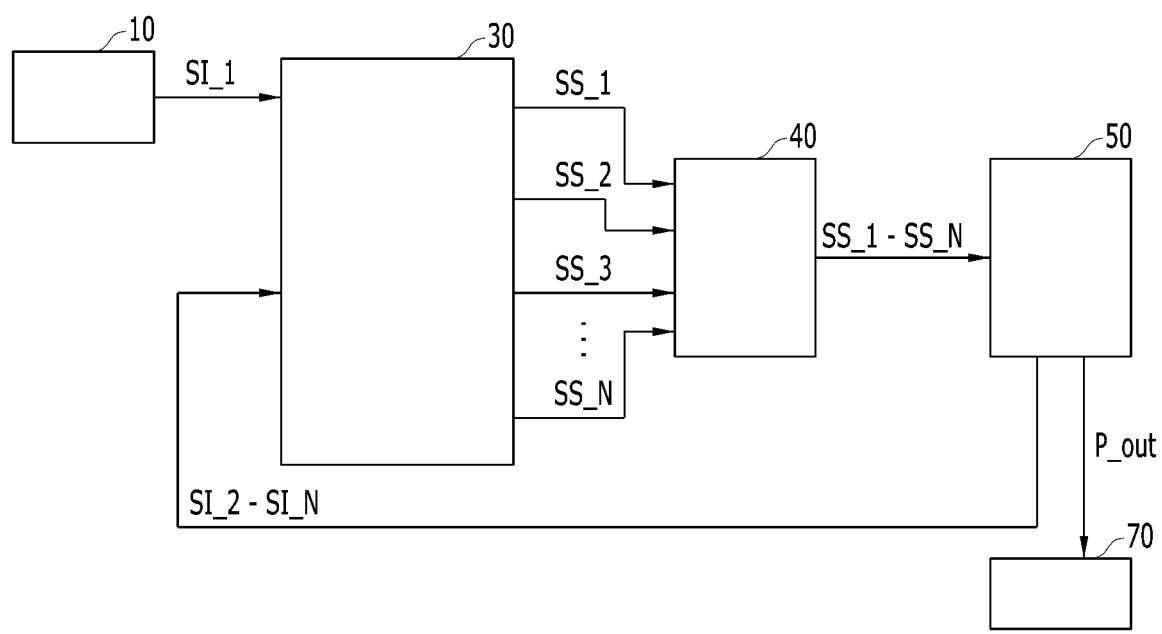
FIG. 12 is a block diagram illustrating a neuromorphic device in accordance with an embodiment of the present disclosure.

FIG. 12 is a block diagram illustrating a neuromorphic device in accordance with an embodiment of the present disclosure. Referring to FIG. 12, the neuromorphic device in accordance with the embodiment of the present disclosure may include an input element 10, a synapse element 30, a data collector 40, a logic element 50, and an output element 70. The input element 10 and the output element 70 may be understood as described above with reference to FIG. 1, and the data collector 40 may be understood as described above with reference to FIGS. 4 and 5. The synapse element 30 may include a common pre-synaptic buffer 35, but it does not include a common post-synaptic buffer 36 as described above with reference to FIG. 10.

Figure 13:
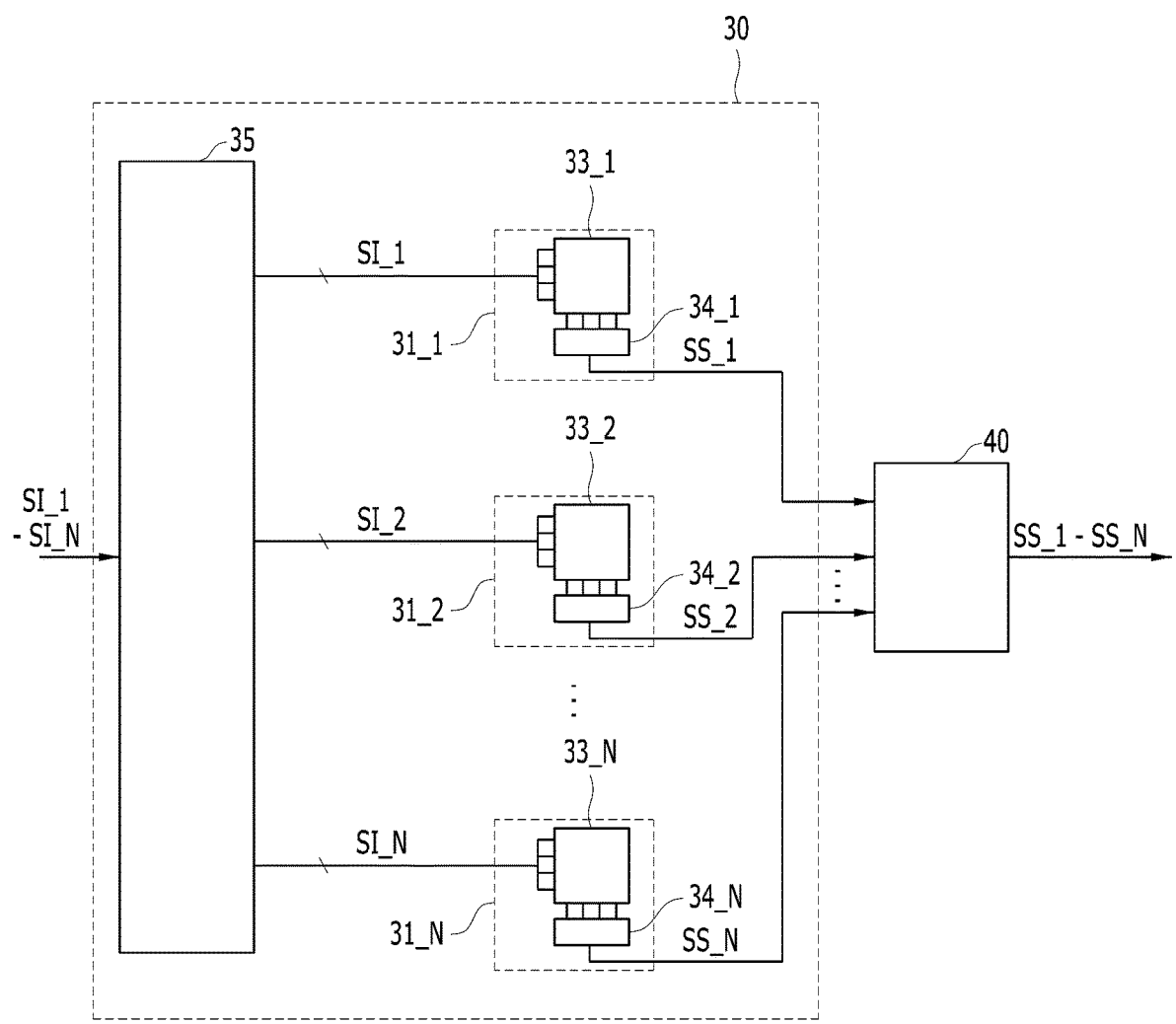
FIG. 13 is a block diagram illustrating a synapse element of the neuromorphic device shown in FIG. 12.

FIG. 13 is a block diagram illustrating the synapse element 30 of the neuromorphic device shown in FIG. 12. Referring to FIG. 13, the synapse element 30 may include a common pre-synaptic buffer 35 and first to $N^{th}$ synapse blocks 31_1 to 31_N. The common pre-synaptic buffer 35 may include the block selector 20 as described above with reference to FIGS. 4 and 5, and the first to $N^{th}$ pre-synaptic neurons 32_1 to 32_N as described above with reference to FIGS. 2 and 5. The common pre-synaptic buffer 35 may receive the first to $N^{th}$ input signals SI_1 to SI_N to distribute to the first to $N^{th}$ synapse blocks 31_1 to 31_N. The first to $N^{th}$ synapse blocks 31_1 to 31_N do not include the first to $N^{th}$ pre-synaptic neurons 32_1 to 32_N. The first to $N^{th}$ synapse blocks 31_1 to 31_N may include the first to $N^{th}$ synapse arrays 33_1 to 33_N and the first to $N^{th}$ post-synaptic neurons 34_1 to 34_N. The synapse signals SS_1 to SS_N provided from the first to $N^{th}$ post-synaptic neurons 34_1 to 34_N may be provided to the data collector 40.

Figure 14:
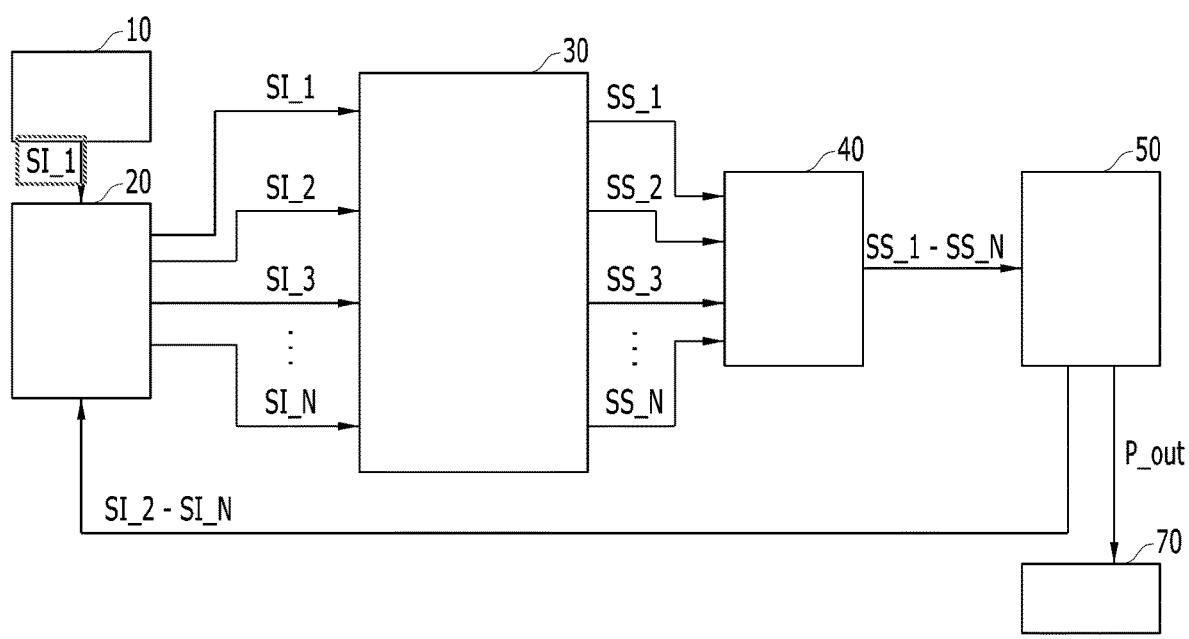
FIG. 14 is a block diagram illustrating a neuromorphic device in accordance with an embodiment of the present disclosure.

FIG. 14 is a block diagram illustrating a neuromorphic device in accordance with an embodiment of the present disclosure. Referring to FIG. 14, the neuromorphic device in accordance with the embodiment of the present disclosure may include an input element 10, a block selector 20, a synapse element 30, a data collector 40, a logic element 50, and an output element 70. The initial input signal SI_1 of the input element 10 may be provided to the block selector 20.

In other words, the block selector 20 may receive the initial input signal SI_1 and the re-input signals SI_2 to SI_N, and provide them to the synapse element 30. The synapse element 30 may include first to $N^{th}$ synapse blocks 31_1 to 31_N for receiving input signals SI_1 to SI_N, respectively, from the block selector 20. The remaining constituent elements of FIG. 14 may be understood as described with reference to FIG. 4.

Figure 15:
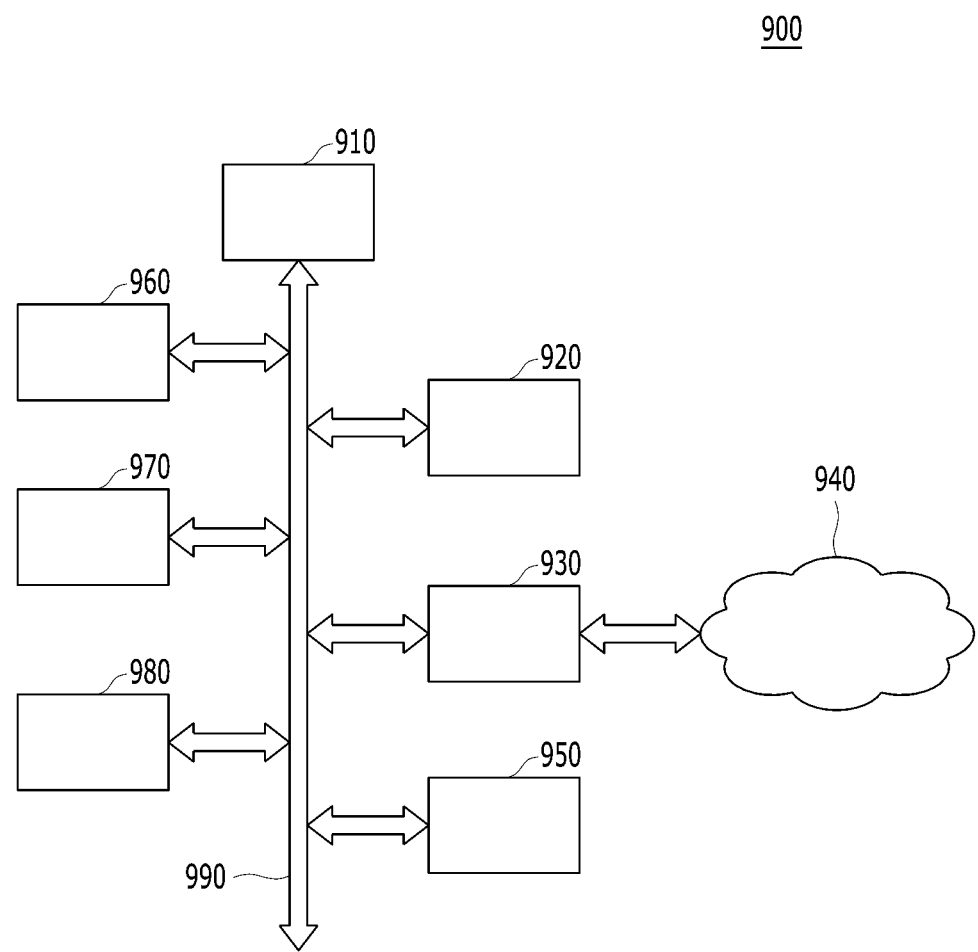
FIG. 15 is a block diagram schematically illustrating a pattern recognition system in accordance with an embodiment of the present disclosure.

FIG. 15 is a block diagram schematically illustrating a pattern recognition system 900 in accordance with an embodiment of the present disclosure. For example, the pattern recognition system 900 may be one among a speech recognition system, an imaging recognition system, a code recognition system, a signal recognition system, and other systems for recognizing diverse patterns.

Referring to FIG. 15, the pattern recognition system 900 in accordance with the embodiment of the present disclosure may include a central processing unit 910, a memory unit 920, a communication control unit 930, a network 940, an output unit 950, an input unit 960, an analog-to-digital converter 970, a neuromorphic unit 980, and/or a bus 990. The central processing unit 910 may generate and provide various signals for learning of the neuromorphic unit 980, and perform various processing and functions for recognizing patterns, such as voice, video, etc., according to the output from the neuromorphic unit 980.

The central processing unit 910 may be coupled to the memory unit 920, the communication control unit 930, the output unit 950, the analog-to-digital converter 970, and the neuromorphic unit 980 through the bus 990.

The memory unit 920 may store various information required to be stored in the pattern recognition system 900. The memory unit 920 may be at least one among volatile memory devices such as DRAM or SRAM, non-volatile memory devices such as PRAM, MRAM, ReRAM, or NAND flash memory, and diverse storage units, such as a hard disk drive (HDD) or a solid state drive (SSD).

The communication control unit 930 may transfer and/or receive the data such as recognized voice, video, etc., to a communication control unit of another system through the network 940.

The output unit 950 may output the data such as recognized voice, video, etc., in various ways. For example, the output unit 950 may include a speaker, a printer, a monitor, a display panel, a beam projector, a hologrammer, or other diverse output devices.

The input unit 960 may include at least one among a microphone, a camera, a scanner, a touchpad, a keyboard, a mouse, a mouse pen, and diverse sensors.

The analog-to-digital converter 970 may convert the analog data provided from the input device 960 as digital data.

The neuromorphic unit 980 may perform learning, recognition, and the like based on the data provided from the analog-to-digital converter 970, and output data corresponding to the recognized pattern. The neuromorphic unit 980 may include at least one among the neuromorphic devices in accordance with various embodiments of the present disclosure.

According to the embodiments of the present disclosure, neuromorphic devices may include a plurality of synapse blocks and a common logic element shared by the synapse blocks. In other words, a plurality of synapse blocks may share one logic circuit. Therefore, a circuit may be simplified and the effective area of a chip may be reduced, compared with when each of a plurality of synapse blocks individually includes a plurality of logic elements or logic circuits.

Therefore, according to the embodiments of the present disclosure, the size of the neuromorphic devices may be formed smaller and the productivity may be improved.

Other effects of the diverse embodiments of the present invention that are not described herein may be understood from the detailed description of the present disclosure.

While the present invention has been described with respect to the specific embodiments, it will be apparent to those skilled in the art that various changes and modifications may be made without departing from the spirit and scope of the invention as defined in the following claims.

What is claimed is:

1. A neuromorphic device, comprising:
an input element;
a synapse element having a plurality of synapse blocks;
a logic element; and
an output element,
wherein the plurality of synapse blocks share the logic element,
wherein the logic element receives a synapse signal from the synapse element, and the logic element processes the synapse signal to provide an output signal to the output element, or to provide an input signal to the synapse element,
wherein the logic element includes:
an input buffer configured to receive the synapse signal from the synapse element;
a first module configured to quantize the synapse signal received from the input buffer;
a storage unit configured to receive and temporarily store a quantized electrical signal from the first module; and
a switch unit configured to provide the electrical signal stored in the storage unit to the output element or to the synapse element.

2. The neuromorphic device of claim 1,
wherein each of the plurality of synapse blocks includes a pre-synaptic neuron, a synapse array, and a post-synaptic neuron, respectively.

3. The neuromorphic device of claim 2,
wherein the pre-synaptic neuron receives an input signal from the input element and the logic element.

4. The neuromorphic device of claim 2,
wherein the post-synaptic neuron provides a synapse signal to the logic element.

5. The neuromorphic device of claim 1,
wherein the logic element further includes:
an output buffer configured to receive and store the quantized electrical signal from the storage unit, and provide the stored electrical signal to the output element.

6. The neuromorphic device of claim 1,
wherein the logic element includes:
an input buffer configured to receive the synapse signal from the synapse element;
a first module configured to quantize the synapse signal received from the input buffer;
a storage unit configured to receive and temporarily store an quantized electrical signal from the first module;
a switch unit configured to determine whether to provide the quantized electrical signal stored in the storage unit to the output element or to the synapse element;
a second module configured to anti-quantize the quantized electrical signal stored in the storage unit; and
a re-input buffer configured to receive an anti-quantized electrical signal from the second module and provide the anti-quantized electrical signal to the synapse element.

7. The neuromorphic device of claim 1, further comprising:
a block selector configured to receive an electrical signal from the logic element and to select one of the plurality of synapse blocks to receive the electrical signal.

8. The neuromorphic device of claim 1, further comprising:
a data collector configured to receive an electrical signal from the synapse element and to provide the electrical signal to the logic element.

9. The neuromorphic device of claim 1, further comprising:
a common pre-synaptic neuron configured to receive a first electrical signal from the input element and a second electrical signal from the logic element, and to select one of the plurality of synapse blocks to receive the first and second electrical signals.

10. The neuromorphic device of claim 1, further comprising:
a common post-synaptic neuron configured to receive an electrical signal from the plurality of synapse blocks of the synapse element and to provide the received electrical signal to the logic element.

11. A neuromorphic device, comprising:
a synapse element having a plurality of synapse blocks; and
a logic element coupled in common to the plurality of synapse blocks,
wherein the logic element receives synapse signals from the plurality of synapse blocks and provides re-input signals to the plurality of synapse blocks,
wherein the logic element includes:
a first module configured to receive and quantize the synapse signals;
a storage unit configured to temporarily store the quantized synapse signals;
a switch unit configured to decide whether to provide the quantized synapse signals to the synapse element.

12. The neuromorphic device of claim 11,
wherein the logic element further includes:
a second module configured to anti-quantize the quantized synapse signals stored in the storage unit; and
a re-input buffer configured to provide the anti-quantized synapse signals to the synapse element as the re-input signals.

13. The neuromorphic device of claim 12, further comprising:
a block selector configured to select one of the plurality of synapse blocks and to provide the re-input signals to the selected synapse block.

14. The neuromorphic device of claim 12, further comprising:
a data collector configured to receive the synapse signals from the plurality of synapse blocks and to provide the received synapse signals to the logic element.

15. The neuromorphic device of claim 12,
wherein the first module includes an analog-to-digital converter, and
wherein the second module includes a digital-to-analog converter.

16. The neuromorphic device of claim 11,
wherein the synapse element includes:
a common pre-synaptic neuron configured to receive the re-input signals from the logic element, to select one of the plurality of synapse blocks, and to provide the received re-input signals to the selected synapse block.

17. The neuromorphic device of claim 11,
wherein the synapse element includes:
a common post-synaptic neuron configured to receive the synapse signals from the plurality of synapse blocks and to provide the received synapse signals to the logic element.

18. The neuromorphic device of claim 11, further comprising:
an input element configured to provide an input signal to the synapse element;
a block selector configured to receive the re-input signals from the logic element and to provide the received re-input signals to the synapse element;
a data collector configured to receive the synapse signals from the synapse element and to provide the received synapse signals to the logic element; and
an output element that is provided with an output signal from the logic element.

\* \* \* \* \*